2,931,821

NOVEL OXAMIMIDATE HYDROHALIDES AND METHOD FOR PREPARING SAME

Richard Parke Welcher, Old Greenwich, Conn., assignor to American Cyanamid Company, New York, N.Y., a corporation of Maine No Drawing. Application July 19, 1957
Serial No. 672,867

11 Claims. (Cl. 260—453)

This invention relates to new and novel oxamimidate salts and to a method for their preparation. More particularly, it relates to new oxamimidate hydrohalides useful in the manufacture of oxamide.

The compounds of the present invention may be represented by the general formula:

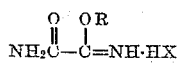

wherein X is a halogen and R is a hydrocarbon residue derived from a monohydric alcohol of from 1 to 18 carbon atoms. The hydrocarbon residue may be saturated or unsaturated, straight-chained or branched. Illustrative of the latter residue include alkyl or cycloalkyl as methyl, ethyl, isopropyl, n-butyl, sec-butyl, cyclobutyl, pentyl, hexyl, cyclohexyl, n-dodecyl, stearyl and oleyl; aralkyl such as benzyl, phenethyl, phenylbutyl and the like; and X is a halide such, for example, as fluoride, chloride, bromide or iodide. The products formed are white solids which can be converted to oxamide on heating. Oxamide is a known leaf fertilizer as disclosed in United States Letters Patent 2,663,629.

The compounds of the present invention are prepared by reacting cyanoformamide with a monohydric alcohol containing 1 to 18 carbon atoms in an anhydrous acidified medium while maintaining the reaction temperature between about 0° C. and 30° C. Since the compounds so prepared are relatively unstable over long time intervals, it is preferred to store them at moderately low temperatures, say between 0° C. and 10° C.

It is a good practice to react cyanoformamide with the monohydric alcohol in substantially equimolar proportions. However, an excess of either reactant can be used without affecting deleteriously the ease of reaction, purity of product or yield.

Typically illustrative monohydric alcohols which contain from 1 to 18 carbon atoms include, for example: alkyl or cycloalkyl alcohols, such as methanol, ethanol, isopropanol, n-butanol, sec-butanol, amyl alcohol, cyclobutanol, cyclohexanol, lauryl alcohol, oleyl alcohol, cetyl alcohol and stearyl alcohol; and araliphatic alcohols, such as benzyl alcohol, phenethyl alcohol, phenylpropyl alcohol and the like.

Any of the known hydrogen halides may be introduced to acidify the reaction medium. These halides are: hydrogen fluoride, hydrogen chloride, hydrogen bromide and hydrogen iodide. The acid, preferably hydrogen chloride, is added in amounts sufficient to effect salt formation. It is found advantageous to add at least one or more moles of the above acid per mole of cyanoformamide or alcohol reactant. In practice, the acid is added preferably in the gaseous state.

The process of the invention will be more fully illustrated in the following examples which represent the preparation of typical oxamimidate salts and should be construed as being the preferred, non-limitative features of the defined process. Unless otherwise stated, the parts given are by weight.

EXAMPLE 1

Ethyl oxamimidate hydrochloride preparation 10.5 parts of cyanoformamide (0.15 mole) is added to a previously dried apparatus comprising a suitable flask equipped with stirrer, thermometer, gas inlet tube and reflux condenser topped with a calcium chloride drying tube. 8.3 parts of anhydrous ethyl alcohol (0.18 mole) and 28 parts of ether are added to the flask while cooling the reaction contents to about 0° C. 9 parts of dry hydrogen chloride gas is passed into the latter mixture over a period of twenty minutes while maintaining the temperature below about 25° C. 21.2 parts of a solid, corresponding to a 93% yield of ethyl oxamimidate hydrochloride based on cyanoformamide, is recovered. This solid mass does not melt or discolor upon heating. However, at temperatures above 200° C., decomposition occurs.

EXAMPLE 2

The procedure of the foregoing example is followed in every material detail except that hydrogen bromide is substituted for hydrogen chloride. Resultant hydrobromide salt exhibits substantially those characteristics and properties described above with respect to the hydrogen chloride salt.

EXAMPLE 3 n-Dodecyl oxamimidate hydrochloride preparation

A total of 11.5 parts of hydrogen chloride gas (0.315 mole) is added to a mixture of 10.5 parts of cyanoformamide (0.15 mole), 33.5 parts of n-dodecyl alcohol (0.18 mole) and 50 parts of dry ether in a suitable vessel. A thick paste resulted, and vigorous cooling is necessary to maintain the temperature below about 25° C. After three days, the product is recovered in 97% yield. A chloride determination also indicates 97% purity of the salt. On heating, the product slowly decomposes.

EXAMPLE 4

Cyclohexyl oxamimidate hydrochloride preparation

A mixture of 10.5 parts of cyanoformamide, 18.0 parts of cyclohexanol and 60 parts of ether in a suitable vessel is gassed with dry hydrogen chloride until 11.5 parts (0.315 mole) is absorbed, while maintaining the reaction contents at about zero degrees centigrade. A precipitate is isolated after three days. A yield of 90% is obtained. Its purity is 93% as shown by determination of chloride in the product. Decomposition of the product occurs on heating.

EXAMPLE 5

Repeating the procedure of Example 4 except that dry hydrogen bromide is introduced and substituted for hydrogen chloride to obtain the corresponding hydrogen bromide salt. The latter exhibits those properties substantially shown in the preceding example with respect to the hydrogen chloride salt.

I claim:
1. As a compound, an oxamimidate characterized by the general formula:

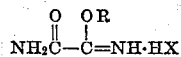

wherein R is a hydrocarbon residue derived from a monohydric alcohol of from 1 to 18 carbon atoms and selected from the group consisting of alkyl, cycloalkyl and aralkyl, and X is a halogen.

2. As a compound, ethyl oxamimidate hydrochloride.
3. As a compound, ethyl oxamimidate hydrobromide.
4. As a compound, cyclohexyl oxamimidate hydrochloride.

5. As a compound, cyclohexyl oxamimidate hydrobromide.
6. As a compound, lauryl oxamimidate hydrochloride.
7. As a compound, lauryl oxamimidate hydrobromide.
8. A process for preparing an oxamimidate hydrohalide characterized by the general formula:

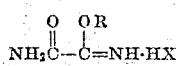

wherein R is a hydrocarbon residue derived from a monohydric alcohol of from 1 to 18 carbon atoms and selected from the group consisting of alkyl, cycloalkyl and aralkyl, and X is a halogen, which comprises: reacting under anhydrous conditions approximately equimolar proportions of cyanoformamide and a monohydric alcohol containing of from 1 to 18 carbon atoms at temperatures between 0° C. and 30° C. in the presence of at least one mole of anhydrous hydrogen halide, said alcohol being selected from the group consisting of alkyl, cycloalkyl, and aralkyl monohydric alcohols, and recovering the thus-formed corresponding oxamimidate hydrohalide.

9. A process for preparing ethyl oxamimidate hydrochloride which comprises: reacting at temperatures between 0° C. and 30° C. under anhydrous conditions approximately equimolar proportions of cyanoformamide and ethyl alcohol in the presence of at least one mole of hydrochloric acid, and recovering the corresponding thus-formed ethyl oxamimidate hydrochloride.

10. A process for preparing cyclohexyl oxamimidate hydrochloride which comprises: reacting at temperatures between 0° C. and 30° C. under anhydrous conditions approximately equimolar proportions of cyanoformamide and cyclohexanol in the presence of at least one mole of hydrochloric acid, and recovering the corresponding cyclohexyl oxamimidate hydrochloride.

11. A process for preparing lauryl oxamimidate hydrochloride which comprises: reacting at temperatures between 0° C. and 30° C. under anhydrous conditions approximately equimolar proportions of cyanoformamide and lauryl alcohol in the presence of at least one mole of hydrochloric acid, and recovering the corresponding thus-formed lauryl oxamimidate hydrochloride.

References Cited in the file of this patent
UNITED STATES PATENTS

| | | |
|---|---|---|
| 2,091,257 | Eckelman et al. | Aug. 31, 1937 |
| 2,161,938 | Sonn | June 13, 1939 |
| 2,553,564 | Fein et al. | May 22, 1951 |
| 2,811,526 | Burtner | Oct. 29, 1957 |

OTHER REFERENCES

Beilstein's Handbuch de Organischen Chemie, vol. 2, 2nd. Supp., 1942, p. 512.

Chemistry of Carbon Compounds, E. H. Rodd., vol. 1, part B, p. 958 (1952).